United States Patent
Denner

Patent Number: 5,911,162
Date of Patent: Jun. 8, 1999

[54] CAPACITIVE PRESSURE TRANSDUCER WITH IMPROVED ELECTRODE SUPPORT

[75] Inventor: John A. Denner, Lynn, Mass.

[73] Assignee: MKS Instruments, Inc., Andover, Mass.

[21] Appl. No.: 08/880,035

[22] Filed: Jun. 20, 1997

[51] Int. Cl.$^6$ .................................................. G01L 9/12
[52] U.S. Cl. ........................... 73/718; 73/724; 361/283.4
[58] Field of Search .................... 73/724, 718; 361/283.4

[56] References Cited

U.S. PATENT DOCUMENTS

| | | | |
|---|---|---|---|
| 3,318,153 | 5/1967 | Lode | 73/798 |
| 3,619,742 | 11/1971 | Rud, Jr. | 317/246 |
| 4,084,438 | 4/1978 | Lee et al. | 73/706 |
| 4,136,603 | 1/1979 | Doyle, Jr. | 92/98 R |
| 4,168,518 | 9/1979 | Lee | 361/283 |
| 4,322,775 | 3/1982 | Delatorre | 361/283 |
| 4,358,814 | 11/1982 | Lee et al. | 361/283 |
| 4,434,203 | 2/1984 | Briefer | 428/152 |
| 4,735,090 | 4/1988 | Jeffrey et al. | 73/706 |
| 4,785,669 | 11/1988 | Benson et al. | 73/718 |
| 4,823,603 | 4/1989 | Ferran et al. | 73/502 |
| 4,977,480 | 12/1990 | Nishihara | 73/724 X |
| 5,020,377 | 6/1991 | Park | 73/718 |
| 5,150,275 | 9/1992 | Lee et al. | 361/283 |
| 5,155,653 | 10/1992 | Kremidas | 361/283 |
| 5,442,962 | 8/1995 | Lee | 73/718 |
| 5,499,533 | 3/1996 | Miller et al. | 73/152 |

FOREIGN PATENT DOCUMENTS

| | | |
|---|---|---|
| 1 282 302 | 11/1968 | Germany . |
| 1 497 212 | 1/1978 | United Kingdom . |
| 2188155 | 9/1987 | United Kingdom . |

OTHER PUBLICATIONS

Baratron® Absolute Pressure Transmitters 400 Series, ©1996 MKS Instruments, Inc., Andover, MA.
Baratron® General Purpose Absolute Pressure Transducers, 1993 MKS Instruments, Inc.

*Primary Examiner*—Joseph L. Felber
*Attorney, Agent, or Firm*—Hale and Dorr LLP

[57] ABSTRACT

The disclosed pressure transducer assembly includes metallic body, a diaphragm, a metallic plate, an insulator, and a conductor. The body defines an interior cavity. The diaphragm is mounted in the body and divides the interior cavity into a first chamber and a second chamber. A portion of the diaphragm flexes in a first direction in response to a pressure in the first chamber being greater than a pressure in the second chamber, and that portion of the diaphragm flexes in a second direction opposite the first direction in response to the pressure in the second chamber being greater than the pressure in the first chamber. The metallic plate is fixed to the metallic body in one of the first and second chambers. The insulator is also disposed in that chamber and is fixed to the metallic plate. The conductor is disposed on the insulator. The diaphragm and the conductor are characterized by a capacitance. The capacitance is representative of a difference between the pressures in the first and second chambers.

34 Claims, 7 Drawing Sheets

CAPACITIVE PRESSURE TRANSDUCER WITH IMPROVED ELECTRODE SUPPORT

REFERENCE TO RELATED APPLICATIONS

The present invention is related to subject matter disclosed in copending U.S. patent application Ser. No. 08/748,820, entitled "Pressure Sensor", which was invented by the inventor of the present invention and which has been assigned to the assignee of the present invention.

BACKGROUND OF THE INVENTION

The present invention relates to capacitive pressure transducers. More specifically, the present invention relates to an improved electrode support for use with capacitive pressure transducers.

Figure 1A:
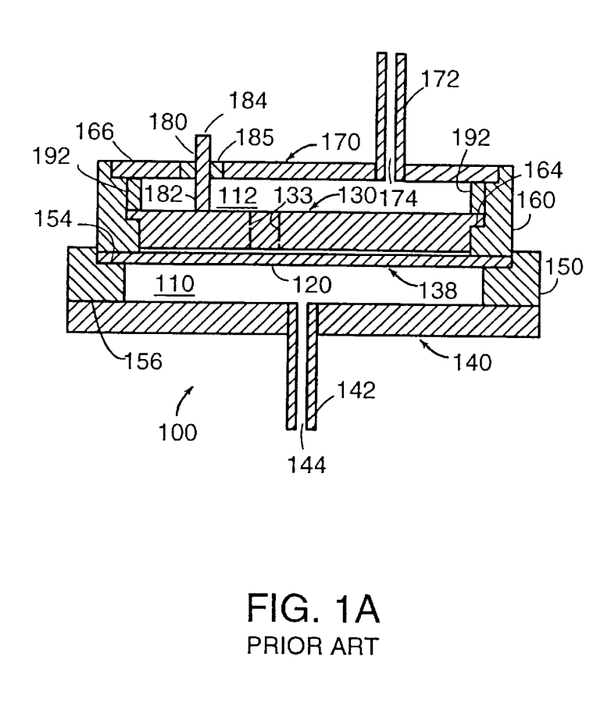
FIG. 1A shows a partially sectional side view of a prior art assembled transducer assembly.
Figure 1B:
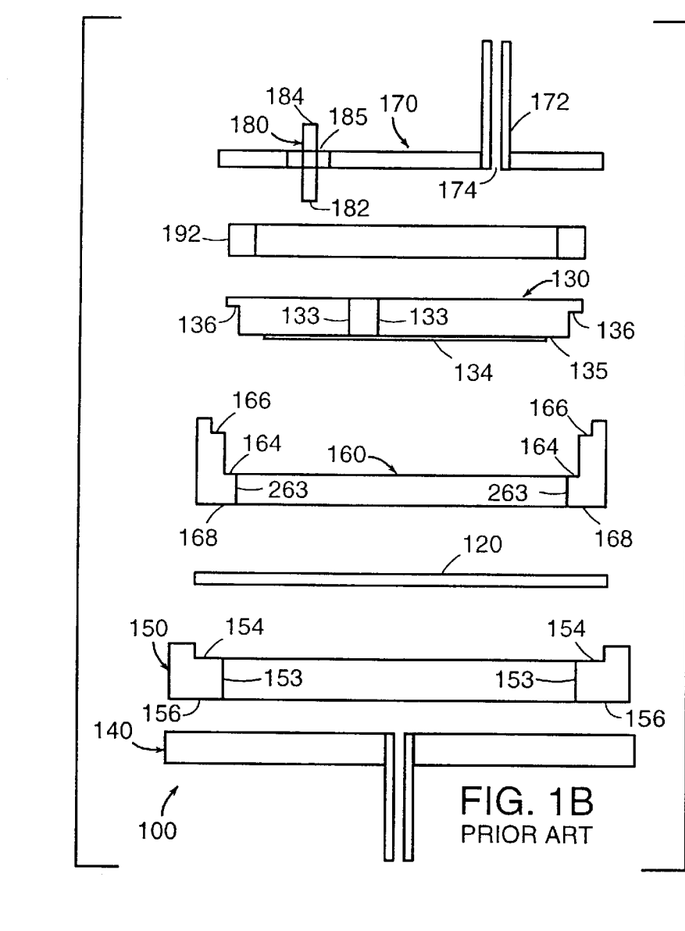
FIG. 1B shows an exploded sectional side view of the assembly shown in FIG. 1A.

FIG. 1A shows a partially sectional side view of an assembled prior art capacitive pressure transducer assembly 100. FIG. 1B shows an exploded sectional side view of transducer assembly 100. For convenience of illustration, FIGS. 1A and 1B, as well as other figures in the present disclosure, are not drawn to scale. U.S. Pat. No. 4,823,603 discloses a capacitive pressure transducer assembly of the general form of transducer assembly 100. U.S. Pat. Nos. 5,020,377 and 4,785,669 also disclose capacitive pressure transducers relevant to the present disclosure.

Briefly, transducer assembly 100 includes a body that defines a first sealed interior chamber 110, and a second sealed interior chamber 112. Chambers 110 and 112 are isolated from one another by a relatively thin, flexible, conductive diaphragm 120. As will be discussed in greater detail below, diaphragm 120 is mounted so that it flexes, or deflects, in response to pressure differentials in chambers 110 and 112. Transducer assembly 100 provides a parameter that is indicative of the amount of diaphragm flexure and this parameter is therefore indirectly indicative of the differential pressure. The parameter provided by transducer assembly 100 indicative of the differential pressure is the electrical capacitance between diaphragm 120 and an electrode 130.

Figure 2A:
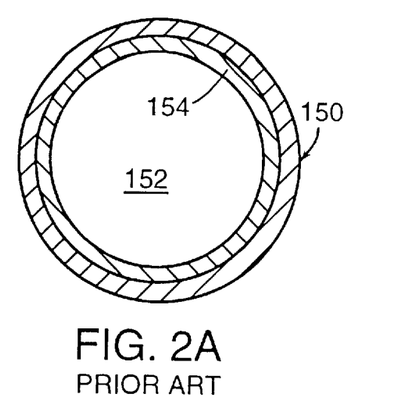
FIG. 2A shows a top view of the P__x body shown in FIGS. 1A–1B.

Transducer assembly 100 includes a P__x cover 140 and a P__x body 150 (as will be discussed below, the term "P__x" refers to an unknown pressure). FIG. 2A shows a top view of P__x body 150. P__x body 150 has a tubular shape and defines a central interior aperture 152 (shown in FIG. 2A and indicated by lines 153 in FIG. 1B). The upper surface of P__x body 150 is stepped and provides a shoulder 154 that extends around the perimeter of aperture 152. P__x body 150 also includes a lower surface 156. The P__x cover 140 is a circular metallic sheet and is provided with a pressure tube 142 that defines a central aperture 144. The P__x cover 140 is rigidly affixed to the lower surface 156 of P__x body 150 (e.g., by welding). Diaphragm 120 is normally a thin, circular, flexible sheet of conductive material (e.g., stainless steel). As stated above, FIGS. 1A and 1B are not drawn to scale, and diaphragm 120 is normally much thinner than illustrated in comparison to the other components of transducer assembly 100. Diaphragm 120 contacts shoulder 154 of P__x body 150 as indicated in FIG. 1A. The outer perimeter of diaphragm 120 is normally welded to P__x body 150 to rigidly hold the outer perimeter of diaphragm 120 to the shoulder 154 of P__x body 150.

P__x cover 140, P__x body 150, and diaphragm 120 cooperate to define the interior sealed chamber 110. P__x cover 140 defines the bottom, P__x body 150 defines the sidewalls, and diaphragm 120 defines the top of chamber 110. Fluid in tube 142 may flow through aperture 144, and through central aperture 152 (shown in FIG. 2A) into chamber 110. So, fluid in tube 142 is in fluid communication with the lower surface of diaphragm 120.

Figure 2B:
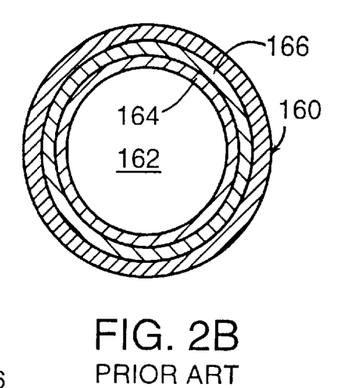
FIG. 2B shows a top view of the P__r body shown in FIGS. 1A–1B.

Transducer assembly 100 also includes a P__r body 160 and a P__r cover 170 (as will be discussed below, the term "P__r" refers to a reference pressure). FIG. 2B shows a top view of P__r body 160. P__r body 160 has a tubular shape and defines a central aperture 162 (shown in FIG. 2B and indicated by lines 263 in FIG. 1B). The upper surface of P__r body 160 is stepped and provides a lower shoulder 164 and an upper shoulder 166. The lower shoulder 164 extends around the perimeter of aperture 162, and the upper shoulder 166 extends around the perimeter of lower shoulder 164. P__r body 160 also includes a lower surface 168 opposite to shoulders 164, 166. The lower surface 168 of P__r body 160 is rigidly affixed to the upper surface of the outer perimeter of diaphragm 120 (e.g., by welding). The P__r cover 170 is a circular metallic sheet and is provided with a pressure tube 172 which defines a central aperture 174. P__r cover 170 is rigidly affixed to P__r body 160 (e.g., by welding) so that the outer perimeter of P__r cover 170 is in contact with upper shoulder 166 of P__r body 160.

P__r cover 170, P__r body 160, and diaphragm 120 cooperate to define the interior sealed chamber 112. Diaphragm 120 defines the bottom, P__r body 160 defines the sidewalls, and P__r cover 170 defines the top of chamber 112. Fluid in tube 172 may flow through aperture 174, and through central aperture 162 (shown in FIG. 2B) into chamber 112. So, fluid in tube 172 is in fluid communication with the upper surface of diaphragm 120. As will be discussed below, electrode 130 is housed in, and does not interfere with the fluid flow in, chamber 112.

Figure 2C:
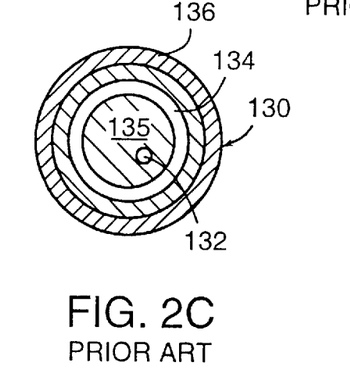
FIG. 2C shows a bottom view of the electrode shown in FIGS. 1A–1B.

Electrode 130 is normally fabricated from a non-conducting (or insulating) ceramic block and has a cylindrical shape. FIG. 2C shows a bottom view of electrode 130. The lower surface of electrode 130 is stepped and includes a central face 135 and a shoulder 136 that extends around the outer perimeter of central face 135. Electrode 130 also defines an aperture 132 (shown in FIG. 2C and indicated by lines 133 in FIG. 1B). Electrode 130 further includes a relatively thin conductor 134 that is deposited (e.g., by electroplating) onto the central face 135. Conductor 134 is explicitly shown in FIGS. 1B and 2C, and for convenience of illustration, conductor 134 is not shown in FIG. 1A. Electrode 130 is clamped between P__r cover 170 and the lower shoulder 164 of the P__r body 160 as shown in FIG. 1A. Aperture 132 (shown in FIG. 2C) in electrode 130 permits fluid to freely flow through electrode 130 between the upper surface of diaphragm 120 and pressure tube 172. Clamping the electrode 130 to the P__r body 160 holds the conductor 134 in spaced relation to the diaphragm 120. Electrode 130 is normally positioned so that the space between conductor 134 and diaphragm 120 is relatively small (e.g., on the order of 0.0002 meters).

Conductor 134 and diaphragm 120 form parallel plates of a capacitor 138. As is well known, C=Ae/d, where C is the capacitance between two parallel plates, A is the common area between the plates, e is a constant based on the material between the plates (e=1 for vacuum), and d is the distance between the plates. So, the capacitance provided by capacitor 138 is a function of the distance between diaphragm 120 and conductor 134. As the diaphragm 120 flexes up and down, in response to changes in the pressure differential between chambers 110 and 112, the capacitance provided by capacitor 138 also changes. At any instant in time, the capacitance provided by capacitor 138 is indicative of the instantaneous differential pressure between chambers 110 and 112. Known electrical circuits (e.g., a "tank" circuit characterized by a resonant frequency that is a function of the capacitance provided by capacitor 138) may be used to measure the capacitance provided by capacitor 138 and to provide an electrical signal representative of the differential pressure.

Transducer assembly 100 includes an electrically conductive feedthrough 180 to permit measurement of the capacitance provided by capacitor 138. One end 182 of feedthrough 180 contacts electrode 130. Feedthrough 180 extends through an aperture in P__r cover 170 so that the other end 184 of feedthrough 180 is external to transducer assembly 100. The aperture in P__r cover 170 through which feedthrough 180 extends is sealed, for example by a melted glass plug 185, to maintain the pressure in chamber 112 and to electrically insulate feedthrough 180 from P__r cover 170. Feedthrough 180 is electrically connected to conductor 134. Electrode 130 normally includes an electroplated through hole (not shown) to permit electrical connection between conductor 134 (on the bottom surface of electrode 130) and end 182 of feedthrough 180 which contacts the top surface of electrode 130. So, feedthrough 180 provides electrical connection to one plate of capacitor 138 (i.e., conductor 134). Since diaphragm 120 is welded to P__r body 160, the P__r body 160 provides electrical connection to the other plate of capacitor 138 (i.e., diaphragm 120). So, the capacitance provided by capacitor 138 may be measured by electrically connecting a measuring circuit (not shown) between P__r body 160 and end 184 of feedthrough 180. In practice, the body of transducer assembly 100 is normally grounded, so the capacitance provided by capacitor 138 may be measured simply by electrically connecting the measuring circuit to end 184 of feedthrough 180.

Conductor 134 is normally disposed in a circular "ring-like" configuration on the lower surface of electrode 130 (as indicated in FIG. 2C). Further, some prior art pressure transducers include more than one conductor disposed on electrode 130 and a corresponding number of feedthroughs to electrically connect to the conductors. Such transducers provide at least two capacitors: a first capacitor formed by diaphragm 120 and one conductor on electrode 130 and a second capacitor formed by diaphragm 120 and another conductor on electrode 130. As is known, providing multiple capacitors in this fashion can be used to advantageously provide temperature compensation for the transducer.

In operation, transducer assembly 100 is normally used as an absolute pressure transducer. In this form, chamber 112 is normally first evacuated by applying a vacuum pump (not shown) to pressure tube 172. After chamber 112 has been evacuated, tube 172 is then sealed, or "pinched off" to maintain the vacuum in chamber 112. This creates a "reference" pressure in chamber 112. Although a vacuum is a convenient reference pressure, it is also known to use other pressures as the reference pressure. Since the pressure in chamber 112 is a known or reference pressure, the components used to construct chamber 112 (i.e., P__r body 160 and P__r cover 170) are referred to as P__r components (i.e., "reference pressure" components). After the reference pressure has been established in chamber 112, the pressure tube 142 is then connected to a source of fluid (not shown) to permit measurement of the pressure of that fluid. Coupling the pressure tube 142 in this fashion delivers the fluid, the pressure of which is to be measured, to chamber 110 (and to the lower surface of diaphragm 120). Since the pressure in chamber 110 is unknown, or is to be measured, the components used to construct chamber 110 (i.e., P__x cover 140 and P__x body 150) are referred to as P__x components (i.e., "unknown pressure" components). The center of diaphragm 120 flexes up or down in response to the differential pressure between chambers 110 and 112. Transducer assembly 100 permits measurement of the amount of flexure of the diaphragm and thereby permits measurement of the pressure in chamber 110 relative to the known pressure in chamber 112.

Transducer assembly 100 can of course also be used as a differential pressure transducer. In this form, pressure tube 142 is connected to a first source of fluid (not shown) and pressure tube 172 is connected to a second source of fluid (not shown). Transducer assembly 100 then permits measurement of the difference between the pressures of the two fluids.

One problem with transducer assembly 100 relates to the spacing between conductor 134 and diaphragm 120. In operation of transducer assembly 100, the diaphragm 120 of course flexes up and down thereby changing the spacing between diaphragm 120 and conductor 134. However, for transducer assembly 100 to provide a consistently accurate pressure reading, it is important to provide a constant nominal spacing between diaphragm 120 and conductor 134. So for a particular pressure differential, it is important to insure that the distance between diaphragm 120 and conductor 134 is always the same. The distance between diaphragm 120 and conductor 134 for a particular pressure differential between chambers 110 and 112 may be referred to as the "nominal distance". When manufacturing large numbers of transducer assemblies 100, it is important to consistently provide the same nominal distance between conductor 134 and diaphragm 120. Further, in any one unit of transducer assembly 100, it is important to insure that the nominal distance remains constant and does not vary over time.

Prior art transducer assembly 100 includes a resilient element 192 for maintaining a constant nominal distance. Resilient element 192 is squeezed between P__r cover 170 and the top of electrode 130. The lower shoulder 164 of P__r body 160 supports shoulder 136 of electrode 130. Since P__r cover 170 is welded to P__r body 160, resilient element 192 provides a spring force that pushes down on electrode 130 and holds electrode 130 in a fixed position relative to P__r body 160. Resilient element 192 is often implemented using a "wave washer" (i.e., a metallic O-ring type washer that has been bent in one or more places in directions perpendicular to the plane of the ring). Resilient element 192 provides a relatively large spring force (e.g., on the order of one hundred pounds) so as to hold electrode 130 in a stable position.

Although transducer assembly 100 holds the electrode 130 securely, the nominal distance between conductor 134 and diaphragm 120 can vary by small amounts over time in response to, for example, mechanical or thermal shock. As those skilled in the art will appreciate, elements that are held in place by compression, such as electrode 130, can exhibit small amounts of movement (sometimes referred to as "creep") over time. This creep can sometimes change the nominal distance and thereby adversely affect the accuracy of the transducer assembly 100. Overpressure conditions can also cause unwanted movement of electrode 130. During normal operation of transducer assembly 100, diaphragm 120 will never contact electrode 130. However, large pressures in chamber 110 beyond the normal operating range of transducer assembly 100 (i.e., overpressure), can cause diaphragm 120 to contact electrode 130 and slightly compress resilient element 192. When the overpressure condition dissipates and diaphragm 120 returns to a normal operating position, resilient element 192 re-expands and reseats electrode 130. Sometimes the new position of electrode 130 will be slightly different than the original position prior to the overpressure condition. Such changes in position can cause shifts in the nominal distance and adversely affect the accuracy of the transducer assembly 100.

It is therefore an object of the present invention to provide a pressure transducer assembly with an improved mounting for the electrode.

SUMMARY OF THE INVENTION

The invention provides an improved mounting for an electrode in a pressure transducer. The mounting provides improved stability for the electrode.

In one aspect, the invention provides an improved pressure transducer assembly. The assembly includes a body, a diaphragm, a plate, an insulator, and a conductor. The body defines an interior cavity. The diaphragm is mounted in the body and divides the interior cavity into a first chamber and a second chamber. A portion of the diaphragm flexes in a first direction in response to a pressure in the first chamber being greater than a pressure in the second chamber, and that portion of the diaphragm flexes in a second direction opposite the first direction in response to the pressure in the second chamber being greater than the pressure in the first chamber. The plate is fixed to the body in one of the first and second chambers (e.g., by welding or screws). The insulator is also disposed in that chamber and is fixed to the plate. The conductor is disposed on the insulator. The diaphragm and the conductor are characterized by a capacitance. The capacitance is representative of a difference between the pressures in the first and second chambers.

In another aspect, the invention provides a transducer assembly that includes a body, a diaphragm, a conductor, and a resilient element. The resilient element is disposed in the body and provides a force that biases the conductor away from the diaphragm.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE PREFERRED EMBODIMENTS

Figure 3A:
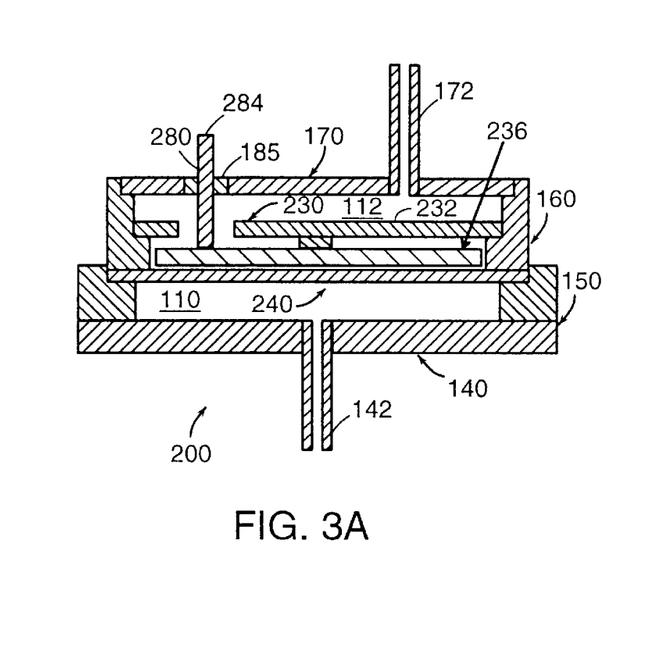
FIG. 3A shows a partially sectional side view of a capacitive pressure transducer assembly constructed according to the present invention.
Figure 3B:
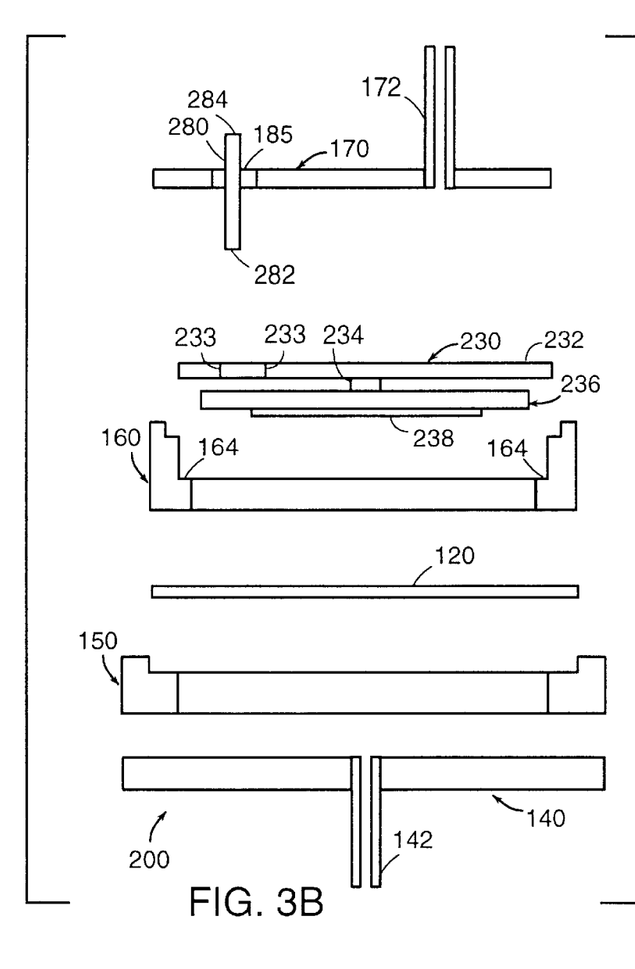
FIG. 3B shows an exploded sectional side view of the assembly shown in FIG. 3A.

FIG. 3A shows a partially sectional side view of an assembled transducer assembly 200 constructed according to the present invention. FIG. 3B shows an exploded sectional side view of transducer assembly 200. In the preferred embodiment, many components used to construct transducer assembly 200 are the same, or are similar to, components used in prior art transducer assembly 100. More specifically, transducer assembly 200 includes the P__x cover 140, P__x body 150, diaphragm 120, P__r body 160, and P__r cover 170 components that were used in prior art transducer assembly 100. However, rather than electrode 130, transducer assembly 200 includes improved electrode 230. Further, transducer assembly 200 eliminates the need for, and preferably does not include, resilient element 192.

As in prior art transducer assembly 100, P__x cover 140, P__x body 150, and diaphragm 120 are connected together to form sealed interior chamber 110 on one side of the diaphragm. Also as in prior art transducer assembly 100, diaphragm 120, P__r body 160, and P__r cover 170 are connected together to form sealed interior chamber 112 on the other side of the diaphragm.

Electrode 230 includes a metallic plate 232, a spacer 234, and a ceramic (or other form of insulative) plate 236. Spacer 234 is positioned between metallic plate 232 and ceramic plate 236. A fastener (not shown) such as a screw, a rivet, or an adhesive, holds metallic plate 232, spacer 234, and ceramic plate 236 securely together. In some embodiments, spacer 234 is formed as an integral part of metallic plate 232 and in other embodiments, spacer 234 is provided as a separate and distinct component. Metallic plate 232 and P__r body 160 are rigidly fixed together, for example by welding, so that the outer perimeter of metallic plate 232 contacts shoulder 164. The lower surface of ceramic plate 236 is provided in conventional fashion with an electrical conductor 238 (shown in FIG. 3B and not in FIG. 3A). Fixing metallic plate 232 to shoulder 164 securely positions conductor 238 in spaced relation to diaphragm 120. Conductor 238 and diaphragm 120 form a capacitor 240. The nominal distance between conductor 238 and diaphragm 120 may be controlled, for example, by selecting a spacer 234 with a desired thickness.

Transducer assembly 200 includes an electrically conductive feedthrough 280 for electrically connecting to conductor 238. One end 282 of feedthrough 280 contacts the upper surface of ceramic plate 236. Feedthrough 280 extends through apertures in metallic plate 232 and P__r cover 170 and the other end 284 of feedthrough 280 is external to transducer assembly 200. As with prior art transducer assembly 100, the aperture in P__r cover 170 through which feedthrough 280 extends is sealed (e.g., with glass plug 185) to maintain pressure in chamber 112 and to electrically insulate feedthrough 280 from P__r cover 170. Metallic plate 232 defines an aperture, indicated by lines 233 in FIG. 3B, through which feedthrough 280 extends. This aperture is larger than feedthrough 280 so that feedthrough 280 does not contact metallic plate 232. This electrically insulates feedthrough 280 from metallic plate 232 and also equalizes pressure on both sides of plate 232 to insure that the pressure in tube 172 is communicated to the upper surface of diaphragm 120. The lower end 282 of feedthrough 280 is electrically connected to conductor 238. Feedthrough 280 is electrically connected to one plate (i.e., conductor 238) of capacitor 240, and P__r body 160 is electrically connected to the other plate (i.e., diaphragm 120) of capacitor 240.

In preferred embodiments, feedthrough 280 does not structurally support ceramic plate 236. Rather, plate 236 is supported by being connected to metallic plate 232 which is rigidly fixed to P__r body 160. As shown more clearly in FIGS. 5, 7, and 8, the electrical feedthrough may include a conductive pin and a conductive coil spring. The pin is rigidly fixed to the P__r cover and the coil spring extends from the pin to the ceramic electrode. While the spring electrically connects to the conductor disposed on the ceramic electrode, the spring does not provide structural support for the electrode.

Unlike prior art electrode 130 (shown in FIGS. 1A and 1B), electrode 230 of transducer assembly 200 is not held in place by spring forces produced by compressing a resilient element. Rather, metallic plate 232 of electrode 230 is rigidly fixed to the P__r body 160 (e.g., by welding or screws). A fastener rigidly holds ceramic plate 236 (and conductor 238) of electrode 230 to metallic plate 232 via spacer 234. This substantially reduces the tendency for electrode 230 to move, or creep, over time and thereby improves the performance of transducer assembly 200. The stability of electrode 230 in response to mechanical and thermal shock as well as to overpressure conditions is improved. Since metallic plate 232 is rigidly fixed to P__r body 160, overpressure conditions do not tend to cause any appreciable movement of electrode 230.

In preferred embodiments of transducer assembly 200, ceramic plate 236 is mounted by fixing only a central portion of the ceramic plate 236 to the metallic plate 232. The outer perimeter of ceramic plate 236 is spaced apart from, and is not in contact with, the P__r body 160. This stands in contrast with prior art transducer assembly 100 wherein the entire outer perimeter of ceramic electrode 130 was supported by the P__r body (and resilient element 192). This improves the stability of electrode 230.

Transducer assembly 200 is also simpler to manufacture than prior art transducer assembly 100. When manufacturing prior art transducer assembly 100, the step or shoulder 136 in electrode 130 must be precisely machined. The need for this shoulder is eliminated in transducer assembly 200 thereby reducing critical feature tolerances.

Electrode 230 is preferably sized to fit as a replacement part into the P__r body 160 of prior art transducer assemblies. Tests conducted on prior art transducer assembly 100 and assembly 200 (where assembly 200 was constructed by substituting electrode 230 for prior art electrode 130) indicate that transducer assembly 200 provides improved performance.

Figure 4A:
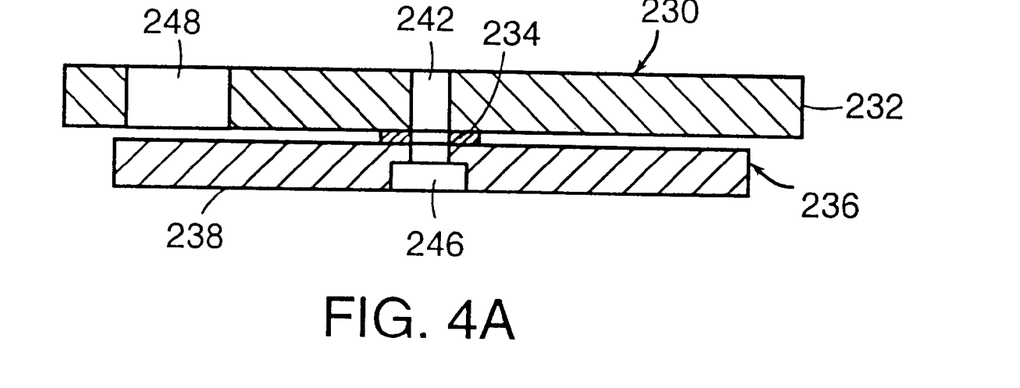
FIGS. 4A and 4B show sectional side and bottom views, respectively, of a preferred embodiment of the electrode shown in FIGS. 3A–3B.
Figure 4B:
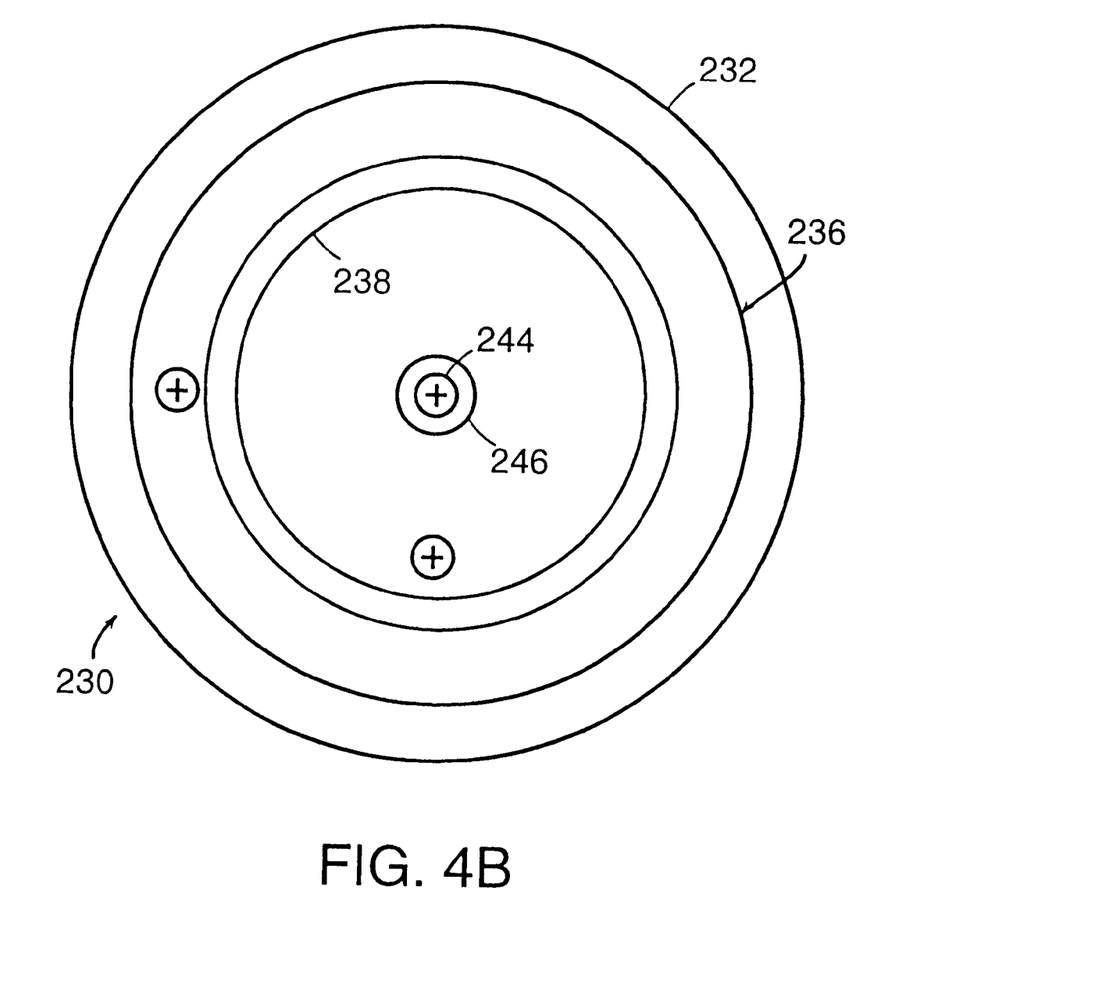

FIGS. 4A and 4B show sectional side and bottom views, respectively, of a preferred embodiment of electrode 230. In this embodiment, metallic plate 232, spacer 234, and ceramic plate 236 each define a central bore hole 242. A portion of bore hole 242 in metallic plate 232 is preferably threaded to permit a screw 244 (shown in FIG. 4B) to hold metallic plate 232, spacer 234, and ceramic plate 236 together. Ceramic plate 236 also preferably defines a depression 246 that is wider than, and that connects to, bore hole 242 to permit counter sinking of screw 244. It is desirable to provide for countersinking of screw 244 in this manner to prevent any portion of screw 244 from entering the space between electrical conductor 238 and diaphragm 120. In other embodiments, a rivet or an adhesive may be used in place of screw 244. In yet another embodiment, one end of screw (or bolt) 244 extends through bore hole 244 and a nut (not shown) is threaded onto that end and cooperates with screw 244 to hold the spacer 234 and plates 232, 236 together. In this embodiment, bore hole 242 may or may not be threaded. FIG. 4A also shows the aperture 248 defined in metallic plate 232 through which feedthrough 280 passes.

In preferred embodiments, P__x cover 140, P__x body 150, P__r body 160, P__r cover 170, metallic plate 232, and spacer 234 are all fabricated from the same metal (e.g., Inconnel ®, a nickel, iron, and chromium alloy ). Ceramic plate 236 is preferably fabricated from alumina or Fosterite (i.e., Magnesium Silicate).

For convenience of description, transducer assembly 200 has been described as having a single conductor disposed on electrode 230. However, those skilled in the art will appreciate that in other embodiments, transducer assembly 200 may include one or more conductors disposed on electrode 230. Further, those skilled in the art will appreciate that plate 232 need not contact shoulder 164 of the P__r body 160 and could instead be fixed in other places to P__r body 160 or P__r cover 170. Still further, in other embodiments, plate 232 could be eliminated and ceramic (or insulative) plate 236 could be supported by another form of metallic structure rigidly fixed to the P__r body or P__r cover.

Figure 5:
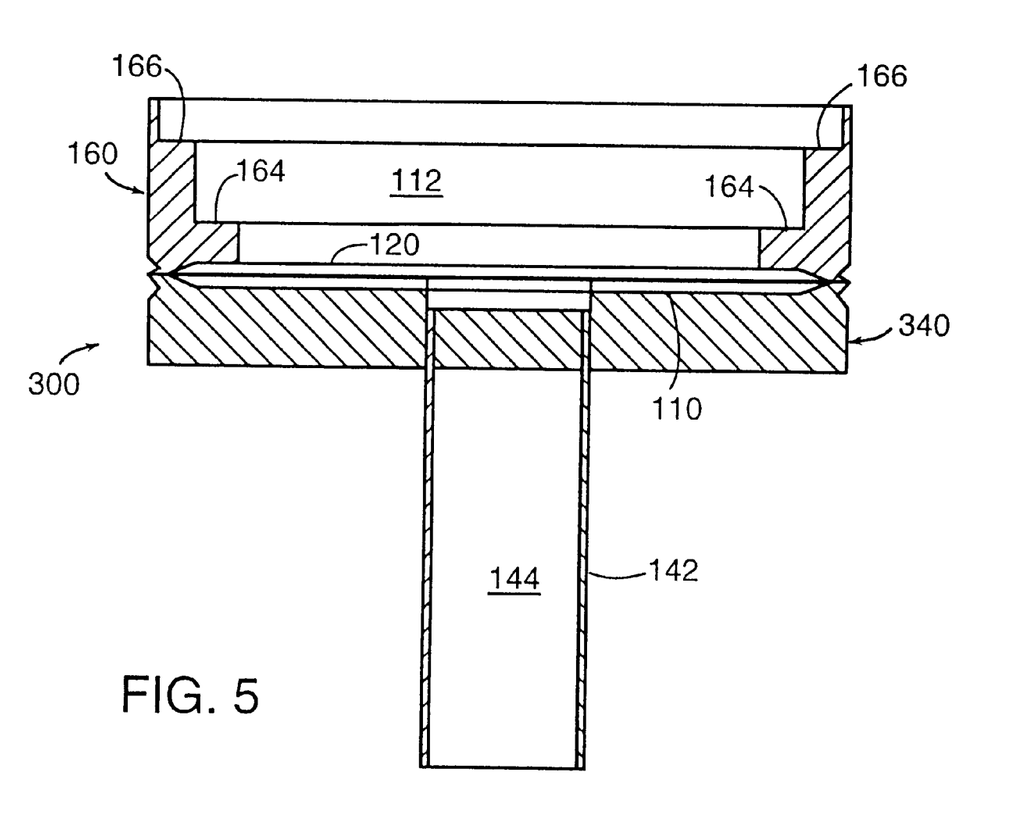
FIG. 5 shows an exploded sectional side view of another pressure transducer assembly constructed according to the present invention.

FIG. 5 shows an exploded sectional side view of another embodiment of a transducer assembly 300 constructed according to the present invention. Transducer assembly 300 includes diaphragm 120 mounted between P__r body 160 and a unified P__x body/cover 340. The outer perimeter of diaphragm 120 is fixed to P__x body/cover 340 to form the first interior sealed chamber 110 on one side of diaphragm 120. P__x body/cover 340 is provided with pressure tube 142 to permit coupling a source of pressurized gas (not shown) to chamber 110. P__r body 160 is also fixed to the outer perimeter of diaphragm 120 on the side of diaphragm 120 opposite to chamber 110.

Figure 6:
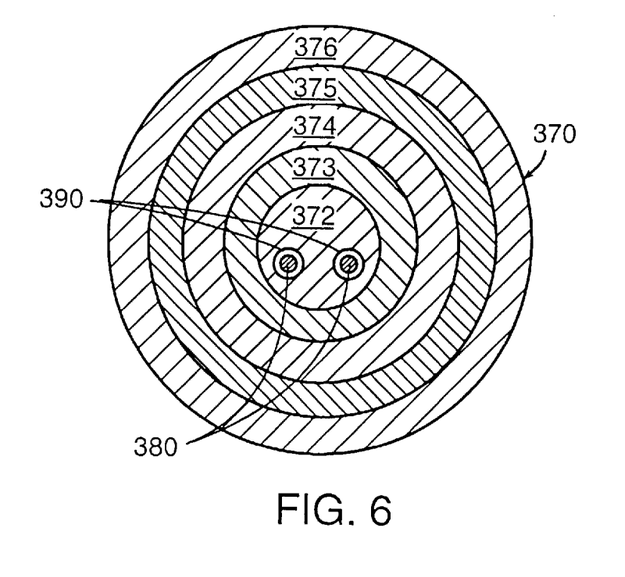
FIG. 6 shows a bottom view of the P__r cover shown in FIG. 5.

Transducer assembly 300 also includes an improved P__r cover 370 and annular resilient elements 390. FIG. 6 shows a bottom view of P__r cover 370. As shown in FIGS. 5 and 6, the lower surface of P__r cover 370 is stepped and defines a central face 372, a first shoulder 373, a second shoulder 374, a third shoulder 375, and a fourth shoulder 376. The first shoulder 373 extends around at least a portion of the perimeter of the central face 372; the second shoulder 374 extends around at least a portion of the perimeter of the first shoulder 373; the third shoulder 375 extends around at least a portion of the perimeter of the second shoulder 374; and the fourth shoulder 376 extends around at least a portion of the perimeter of the third shoulder 375. In the illustrated embodiment, central face 372 is circular and shoulders 373–376 are annular and are concentric with central face 372. The first and second shoulders 373, 374 are separated by a vertical face 378.

When transducer assembly 300 is assembled, the fourth shoulder 376 of P_r cover 370 contacts the upper shoulder 166 of the P_r body 160. The third shoulder 375 preferably contacts, or nearly contacts, the lower shoulder 164 of the P_r body 160. In the illustrated embodiment, the second shoulder 374 is recessed from the third shoulder 375 (so that the second shoulder 374 is disposed further away from diaphragm 120 than is the third shoulder 375), the first shoulder 373 is recessed from the second shoulder 374, and the central face 372 is recessed from the first shoulder 373.

Transducer assembly 300 also includes an electrode 330. Electrode 330 has the same general form as electrode 130, however, the outer perimeter of electrode 330 is smaller than that of electrode 130. Electrode 330 is generally cylindrical. The lower surface of electrode 330 is stepped and provides a central face and a shoulder 336 that extends around the perimeter of the central face. Electrode 330 also includes a conductor (not shown) deposited onto the central face of the lower surface.

When transducer assembly 300 is assembled, the P_r cover 370 is rigidly attached (e.g., by welding) to P_r body 160. The P_r cover 370, the P_r body 160, and the diaphragm 120 cooperate to form the second sealed interior chamber 112 opposite to the first interior chamber 110. Although not illustrated, those skilled in the art will appreciate that P_r cover 370 may be provided with a pressure tube to provide access to chamber 112. An outer portion of resilient element 390 rests on the lower shoulder 164 of P_r body 160. When transducer assembly 300 is assembled, the third shoulder 375 of the P_r cover and the lower shoulder 164 of the P_r body preferably squeeze the outer perimeter of the resilient element 390. The inner perimeter of the resilient element 390 contacts the shoulder 336 of electrode 330 and provides a force that tends to push the electrode 330 away from the diaphragm 120. More specifically, the resilient element 390 pushes the electrode so that the upper surface of electrode 330 contacts and is supported by the first shoulder 373 of the P_r cover. Further, the vertical face 378 of the P_r cover 370 restricts movement of electrode 330 in directions parallel to the diaphragm 120. The P_r cover 370 is preferably sized so that the electrode 330 snugly fits within the vertical face 378 that separates the first and second shoulders 373, 374.

In the illustrated embodiment, transducer assembly 300 includes two electrical feedthroughs that extend through P_r cover 370 and make electrical contact with two conductors (not shown) disposed on the lower surface of electrode 330. Each of the feedthroughs 380 are surrounded by insulators 381 that may be made for example from glass. Insulators 381 electrically insulate feedthroughs 380 from the P_r cover 370 and also maintain pressure inside the second interior cavity 112.

The P_r cover 370 rigidly supports electrode 330 and prevents electrode 330 from moving in a direction away from diaphragm 120 (e.g., in response to an overpressure condition). Resilient element 390 provides a relatively small force (e.g., on the order of ten pounds) that prevents motion of electrode 330 towards diaphragm 120. The relatively small force applied by resilient element 390 maintains contact between the upper surface of electrode 330 and the first shoulder 373 of P_r cover 370. P_r cover 370 thereby rigidly supports the electrode 330 and rigidly prevents the electrode 330 from moving in a direction away from the diaphragm 120.

Prior art transducer assembly 100 used resilient element 192 to provide a relatively large force (e.g., 100 pounds) to push electrode 130 down towards the diaphragm to attempt to rigidly hold electrode 130 in place. In contrast to the prior art, in transducer assembly 300, the resilient element 390 provides a relatively small force (e.g., ten pounds) that biases the electrode 330 upwards away from the diaphragm and the P_r cover 370 rigidly prevents the electrode 330 from moving in a direction away from diaphragm 120. Transducer assembly 300 thereby advantageously maintains a substantially constant nominal spacing between the diaphragm 120 and the conductors (not shown) of electrode 330.

Figure 7:
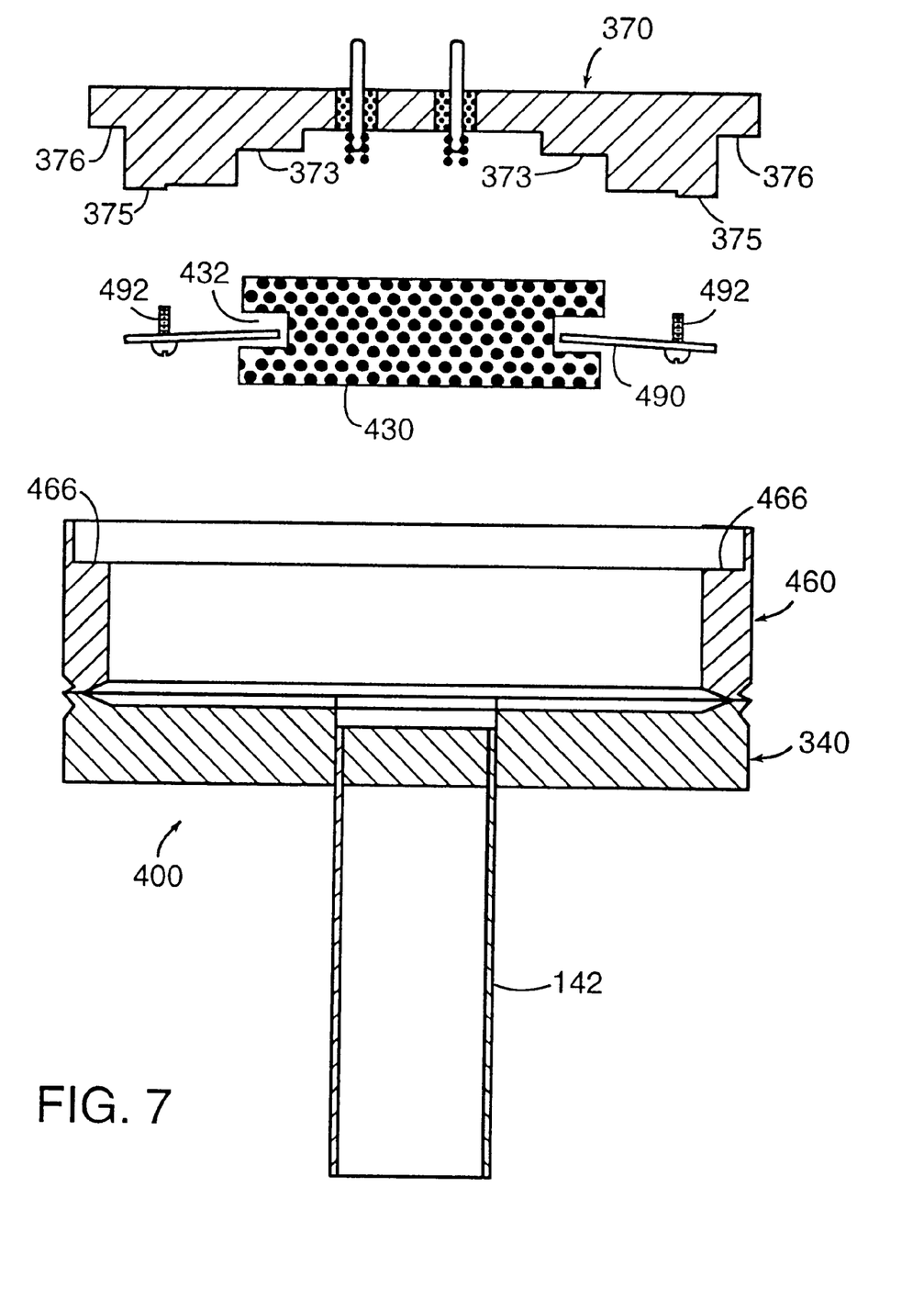
FIG. 7 shows an exploded sectional side view of yet another pressure transducer assembly constructed according to the present invention.

FIG. 7 shows an exploded side view of another embodiment of a pressure transducer assembly 400 constructed according to the present invention. Transducer assembly 400 preferably includes the same P_x body/cover 340 and the same P_r cover 370 that were used in assembly 300 (shown in FIG. 5). However, rather than P_r body 160 and electrode 330 which were used in transducer assembly 300, transducer assembly 400 includes a cylindrical P_r body 460 and a cylindrical electrode 430. P_r body 460 is simpler than P_r body 160 because P_r body 460 includes only a single shoulder 466 (rather than two shoulders). Those skilled in the art will appreciate that providing each shoulder requires a separate machining step. So, since P_r body 460 includes only a single shoulder it costs less to produce than P_r body 160. Similarly, electrode 430 is simpler than electrode 330. As discussed above, electrode 330 provides a shoulder 336. Rather than a shoulder, electrode 430 provides a groove 432 in at least a portion of the perimeter of electrode 430. Those skilled in the art will appreciate that it is less expensive to provide a groove such as groove 432 than it is to provide a shoulder such as shoulder 336 in a ceramic component such as electrode 430. So electrode 430 costs less to produce than electrode 330.

When assembled, P_r cover 370 is fixed to P_r body 460 so that shoulder 376 of the P_r cover 370 contacts the shoulder 466 of the P_r body. Rather than being supported by a portion of the P_r body, the outer perimeter of resilient element 490 is fixed to the fourth shoulder 375 of the P_r cover 370 for example by screws 492 or other fasteners such as rivets or adhesives. The inner perimeter of resilient element 490 contacts electrode 430 inside of groove 432 and applies a force that biases electrode 430 against the first shoulder 373 of the P_r body 370. Resilient element 490 and P_r cover 370 provide improved support for electrode 430 similar to that provided in transducer assembly 300 (shown in FIG. 5). However, rather than use a shoulder of the P_r body to support the outer perimeter of the resilient element, the outer perimeter of the resilient element is fixed to the P_r cover. This advantageously eliminates the need for the extra shoulder in the P_r body.

Figure 8:
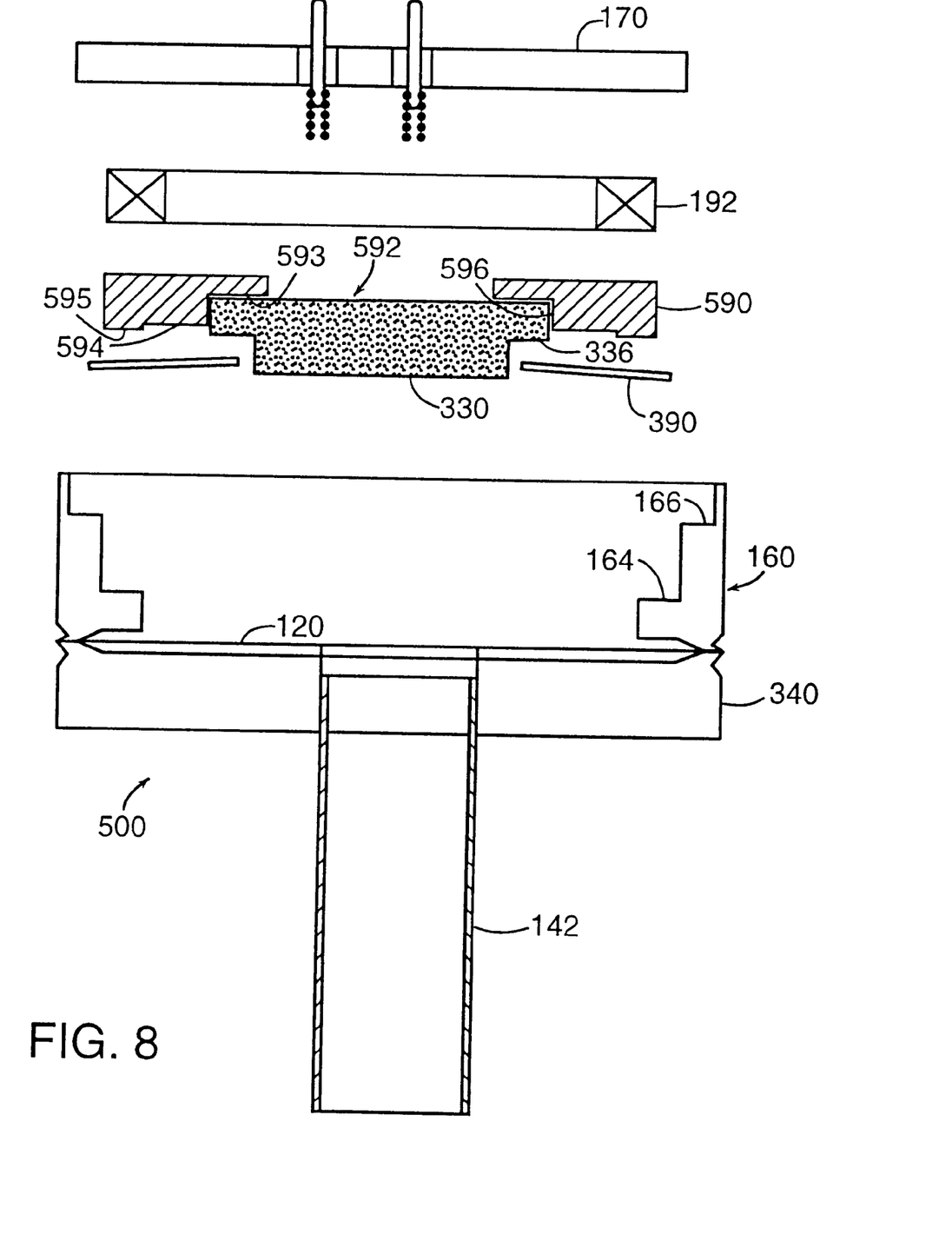
FIG. 8 shows an exploded sectional side view of still another pressure transducer assembly constructed according to the present invention.

FIG. 8 shows a sectional side view of yet another pressure transducer assembly 500 constructed according to the present invention. Transducer assembly 500 includes a tubular P_r support 590. P_r support 590 defines a central aperture 592. The lower surface of P_r support 590 is stepped and defines a first shoulder 593, a second shoulder 594, and a third shoulder 595. The first shoulder 593 extends around the perimeter of aperture 592. The second shoulder extends around the perimeter of the first shoulder 593. The third shoulder 595 extends around the perimeter of the second shoulder 594. The first and second shoulders 593, 594 are separated by a vertical face 596. In the illustrated embodiment, the central aperture 592 is circular; the first, second, and third shoulders 593, 594, 595 are annular; and the first, second, and third shoulders 593, 594, 595 are concentric with the central aperture 592.

When transducer assembly 500 is assembled, the lower surface of the outer perimeter of resilient element 390 rests on shoulder 164 of the P__r body 160. The third shoulder 595 of the P__r support 590 rests on the upper surface of the outer perimeter of resilient element 390. The inner perimeter of the resilient element 390 biases the shoulder 336 of electrode 330 upwards so that electrode 330 remains confined by the first shoulder 593 and the vertical face 596 of the P__r support 590. The P__r cover 170 is fixed to the P__r body 160 so that the lower surface of P__r cover 170 contacts the upper shoulder 166 of the P__r body 160. Resilient element 192 is squeezed between P__r cover 170 and the upper surface of the P__r support 590 and exerts a downward force on the P__r support 590.

Prior art transducer assembly 100 used metallic resilient element 192 to directly bias the ceramic electrode in a downwards direction. In contrast, in transducer assembly 500 the metallic resilient element biases the P__r support 590 rather than the ceramic electrode. So, in transducer assembly 500, all the components that are exposed to the relatively large force provided by resilient element 192 (i.e., P__r support 590, resilient element 390, P__r body 160, and P__r cover 170) may be fabricated from the same material (e.g., metal). Ceramic electrode 330 is supported by P__r body 590 rather than by resilient element 192. Transducer assembly 500 therefore provides an improved more stable support for the electrode.

Since certain changes may be made in the above apparatus without departing from the scope of the invention herein involved, it is intended that all matter contained in the above description or shown in the accompanying drawing shall be interpreted in an illustrative and not a limiting sense. As an example, the electrode 430 (shown in FIG. 7) could be used as the electrode in variations of assembly 300 (shown in FIG. 5) or in assembly 500 (shown in FIG. 8). Similarly, the electrode 330 (shown in FIG. 5) could be used in a variation of assembly 400 (shown in FIG. 7). As another example, the metallic plate 232 (shown in FIGS. 3A–3B) of electrode 230 could be fixed to the P__r cover rather than to the P__r body. As yet another example, while annular conductors have been illustrated, those skilled in the art will appreciate that various forms and numbers of conductors may be disposed on the electrodes to form capacitors with the diaphragm. As yet another example, in the preferred embodiment of electrode 230 (shown in FIGS. 3A and 3B), only the central portion of ceramic plate 236 is fixed to metallic plate 232. Those skilled in the art will appreciate however that this is a preferred embodiment and not a limitation of the invention. In other embodiments, other portions of insulating plate 236 may be fixed to metallic plate 232. Still further, in other embodiments, portions or the entire perimeter of insulating plate 236 may contact the P__r body 160.

What is claimed is:

1. A pressure transducer assembly comprising:
   (A) a body defining an interior cavity;
   (B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
   (C) a plate, said plate being fixed to said body in said first chamber;
   (D) an insulator disposed in said first chamber, said insulator being fixed to said plate, a first portion of said plate overlying a first portion of said insulator, said first portion of said plate being spaced apart from said first portion of said insulator;
   (E) a conductor disposed on said insulator, said conductor and said diaphragm being characterized by a capacitance, said capacitance being representative of a difference between said pressures in said first and second chambers.

2. An assembly according to claim 1, wherein said plate and said body are metallic.

3. An assembly according to claim 2, wherein said plate is welded to said body.

4. An assembly according to claim 1, wherein said insulator comprises a ceramic material.

5. An assembly according to claim 1, wherein only a central portion of said insulator is fixed to said plate and a gap is provided between an outer perimeter of said insulator and said body.

6. An assembly according to claim 1, further comprising a spacer disposed between said insulator and said plate.

7. An assembly according to claim 1, wherein said plate comprises a spacer, said spacer being disposed proximal said insulator.

8. An assembly according to claim 1, further including an electrically conductive feedthrough, one end of said feedthrough being disposed in said first chamber and another end of said feedthrough being external to said body, said feedthrough extending through apertures in said plate and said body, said feedthrough being electrically connected to said conductor and being electrically insulated from said plate and from said body.

9. A pressure transducer assembly comprising:
   (A) a body defining an interior cavity;
   (B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
   (C) a plate fixed to said body in said first chamber, said plate comprising a first material;
   (D) an insulator disposed in said first chamber, said insulator comprising a second material different from said first material;
   (E) a fastener fixing a central portion of said insulator to said plate;
   (F) a conductor disposed on said insulator, said conductor and said diaphragm being characterized by a capacitance, said capacitance being representative of a difference between said pressures in said first and second chambers.

10. An assembly according to claim 9, wherein said fastener comprises a screw.

11. An assembly according to claim 9, wherein said fastener comprises a rivet.

12. An assembly according to claim 9, wherein said fastener comprises an adhesive.

13. An assembly according to claim 9, wherein said plate rigidly supports said insulator.

14. An assembly according to claim 9, wherein said body and said plate are metallic.

15. An assembly according to claim 14, wherein said plate is welded to said body.

16. A pressure transducer assembly comprising:
(A) a body defining an interior cavity;
(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
(C) a plate fixed to said body in said first chamber;
(D) an insulator disposed in said first chamber;
(E) a spacer disposed between said plate and said insulator;
(F) a fastener fixing a central portion of said insulator and said spacer to said plate;
(G) a conductor disposed on said insulator, said conductor and said diaphragm being characterized by a capacitance, said capacitance being representative of a difference between said pressures in said first and second chambers.

17. An assembly according to claim 16, wherein said fastener comprises a screw.

18. An assembly according to claim 16, wherein said fastener comprises a rivet.

19. An assembly according to claim 16, wherein said fastener comprises an adhesive.

20. An assembly according to claim 16, wherein said body and said plate are metallic.

21. An assembly according to claim 20, wherein said plate is welded to said body.

22. A pressure transducer assembly comprising:
(A) a metallic body defining an interior cavity;
(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
(C) a metallic member fixed to at least a portion of said metallic body in said first chamber;
(D) an insulator disposed in said first chamber, said insulator being fixed to said metallic member;
(E) a conductor disposed on said insulator, said conductor and said diaphragm being characterized by a capacitance, said capacitance being representative of a difference between said pressures in said first and second chambers.

23. A pressure transducer assembly comprising:
(A) a body defining an interior cavity;
(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
(C) a conductor disposed in one of said first and second chambers, said conductor and said diaphragm being characterized by a capacitance, said capacitance being representative of a difference between said pressures in said first and second chambers;
(D) a resilient element disposed in said one chamber, said resilient element providing a force that biases said conductor away from said diaphragm.

24. An assembly according to claim 23, further including an insulator, said conductor being disposed on said insulator.

25. An assembly according to claim 24, said resilient element contacting a portion of said body and a portion of said insulator.

26. An assembly according to claim 23, said body comprising a sidewall and a cover, a lower portion of said sidewall being fixed to a portion of said diaphragm, a portion of said cover being fixed to an upper portion of said sidewall, said sidewall, said cover, and said diaphragm defining said first chamber.

27. An assembly according to claim 26, further including an insulator, said conductor being disposed on said insulator.

28. An assembly according to claim 27, said resilient element biasing said insulator away from said diaphragm towards said cover.

29. An assembly according to claim 28, a portion of said resilient element contacting said sidewall.

30. An assembly according to claim 28, further including a fastener, said fastener holding a portion of said resilient element in contact with said cover.

31. An assembly according to claim 28, said cover rigidly preventing said insulator from moving in a direction away from said diaphragm.

32. A pressure transducer assembly comprising:
(A) a body defining an interior cavity;
(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
(C) a metallic plate fixed to said body in said first chamber;
(D) an insulator disposed in said first chamber, said insulator being fixed to said plate;
(E) a conductor disposed on said insulator, said conductor and said diaphragm being characterized by a capacitance, said capacitance being representative of a difference between said pressures in said first and second chambers.

33. A pressure transducer assembly comprising:
(A) a body defining an interior cavity;
(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;

(C) a plate welded to said body in said first chamber;

(D) an insulator disposed in said first chamber, said insulator being fixed to said plate;

(E) a conductor disposed on said insulator, said conductor and said diaphragm being characterized by a capacitance, said capacitance being representative of a difference between said pressures in said first and second chambers.

34. A pressure transducer assembly comprising:

(A) a body defining an interior cavity;

(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;

(C) a plate fixed to said body in said first chamber, said plate comprising a first material;

(D) an insulator disposed in said first chamber, said insulator being fixed to said plate, said insulator comprising a second material different from said first material;

(E) a conductor disposed on said insulator, said conductor and said diaphragm being characterized by a capacitance, said capacitance being representative of a difference between said pressures in said first and second chambers.

* * * * *